C. A. Moore,
Knife and Fork Handle.
N° 81,399.     Patented Aug. 25, 1868.

Witnesses,
Mary N Hanmark
M. L. Moore

Inventor,
Charles A. Moore

United States Patent Office

CHARLES A. MOORE, OF WESTBROOK, CONNECTICUT.

Letters Patent No. 81,399, dated August 25, 1868.

IMPROVEMENT IN KNIFE AND FORK-HANDLES.

*The Schedule referred to in these Letters Patent and making part of the same.*

TO ALL WHOM IT MAY CONCERN:

Be it known that I, CHARLES A. MOORE, of Westbrook, in the county of Middlesex, and State of Connecticut, have invented a certain new and useful Improvement in Knife and Fork-Handles; and I do hereby declare that the following is a full and exact description of the same, reference being also had to the accompanying drawings, and to the letters of reference marked thereon.

The nature of my invention consists in making the handles of (or in) various sections or pieces, which join or meet each other, and are secured to the shank or stem of the blade.

To enable others skilled in the art to understand and use my invention, I will proceed to describe the manner in which I carry it out.

Figure 1:
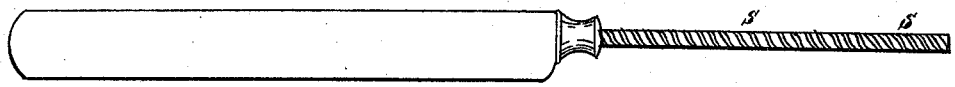
Figure 1 shows an ordinary knife-blade, prepared for the handle, and provided with a screw-shank or stem.

The stem or shank S S, in fig. 1, is made regular and straight, and a screw-thread cut on it.

Figure 2:
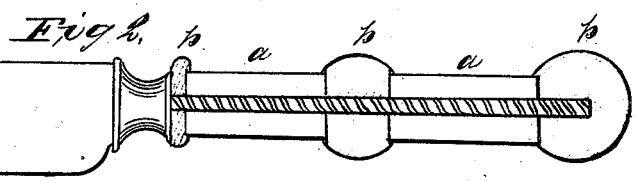
Figure 2 is a sectional view, cut lengthwise, through the centre of the handle or combined sections, showing the stem or shank.
Figure 3:
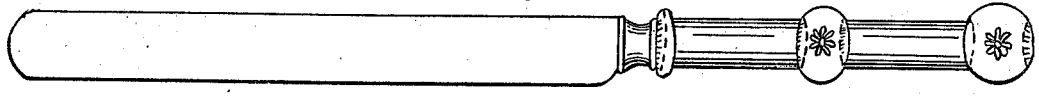
Figure 3 is a knife complete, with handle made in sections, as seen in fig. 2.

The sections, marked $b\ b\ b$, in fig. 2, are spherical, or of similar form, except the one joining the "bolster," which, in form, is similar to the form of a button.

The two sections in fig. 2, marked $a\ a$, are cylindrical, or of similar form.

The sections $a\ a$ are smaller than sections $b\ b\ b$, and are "let into" sections $b\ b\ b$ sufficiently deep for the purpose of concealing the points.

The sections are screwed on to the shank or stem, and, when required, a rivet may be put through the last section and the stem.

If the sections are composed of metal or metals, the sections $a\ a$ may be let into the sections $b\ b$, or not, as desired.

The object of my invention is to improve the quality and appearance of the handles; also, to secure economy in the use of expensive materials, and to produce a variety of changes in form and effect of making the same.

My invention enables one to make a handle of two or more kinds of materials; for instance, pearl and ivory, ivory and metal, ivory and wood, or other materials may be thus united in one and the same handle, and a great variety of changes may be made, as materials of different color, quality, and cost may be thus united; and handles may be made partially or wholly of materials of which it is not practicable or profitable to make them in the ordinary mode.

What I claim as my invention, is—

The making of knife and fork-handles in sections or pieces, substantially as herein specified, and for the objects set forth.

CHAS. A. MOORE.

Witnesses:
GEO. C. MOORE,
M. I. MOORE.